United States Patent
Zhao et al.

[11] Patent Number: 6,115,168
[45] Date of Patent: Sep. 5, 2000

[54] INTEGRATED OPTICAL RETROREFLECTING MODULATOR

[75] Inventors: Ying Zhao; Yong-Sheng Chao, both of Storrs, Conn.

[73] Assignee: Advanced Optical Technologies, Inc., E. Hartford, Conn.

[21] Appl. No.: 09/181,761

[22] Filed: Oct. 29, 1998

[51] Int. Cl.[7] .................................................. G02F 1/03
[52] U.S. Cl. ............................ 359/247; 385/24; 359/246
[58] Field of Search .................................... 359/247, 246, 359/245; 385/24, 4

[56] References Cited

U.S. PATENT DOCUMENTS

| | | | |
|---|---|---|---|
| 4,257,672 | 3/1981 | Balliet | 350/96.17 |
| 4,777,660 | 10/1988 | Gould et al. | 455/605 |
| 5,383,042 | 1/1995 | Robinson | 359/72 |
| 5,600,383 | 2/1997 | Hornbeck | 348/771 |
| 5,757,992 | 5/1998 | Miller | 385/24 |
| 5,818,035 | 10/1998 | Krivanek et al. | 250/208.1 |
| 5,953,148 | 9/1999 | Mosely et al. | 359/237 |

OTHER PUBLICATIONS

Swenson and Steed, Low Power FLC–based Retromodulator Communications System, 2990 SPIE Proceedings 296 (Feb 14, 1997).

Charles M. Swenson and Clark A. Steed, *Low Power FLC–Based Retromodulator Communications System,* 2990 Proceedings of Society of Photo–Optical Instrumentation Engineers 296 (Feb., 1997).

*Primary Examiner*—Georgia Epps
*Assistant Examiner*—Tim Thompson
*Attorney, Agent, or Firm*—Morse, Altman & Martin

[57] ABSTRACT

A retroreflecting modulator including a lens, a light guide, a light modulator, and a reflective surface. Incident light falls on the lens, where it is focused as a spot on a focal surface. The light guide transmits the focused light to the light modulator, where it is modulated and reflected back, via the reflective surface and light guide, to the lens. The lens emits the modulated light in the opposite direction as the incident light. The preferred light-receiving and focusing device is a specialty sphere lens, the preferred light guide is a fiber optic plate, and the preferred light modulator is a liquid crystal modulator. The retroreflecting modulator may be spatially-unresolvable, where a single signal modulates the light, or spatially-resolvable, where the modulation signal depends upon the direction of the incident light.

17 Claims, 5 Drawing Sheets

INTEGRATED OPTICAL RETROREFLECTING MODULATOR

GOVERNMENT FUNDING

The research involved in this application was funded in part by the Department of the Air Force under the Department of Defense contract number F04611-98-C-0020. The intellectual property rights of the applicant and the government of the United States of America are governed by 37 CFR 401.

BACKGROUND OF THE INVENTION

1. Field of the Invention

The present invention relates to optical reflectors, and light modulators, more particularly, to wide-angle optical retroreflectors that can provide light intensity modulation and can be coupled to typical optical components.

2. The Prior Art

A retroreflector is an optical device that reflects an incident light beam from any direction back along its original path without need for optical alignment. A well-known retroreflector is the cube corner type retroreflector or hollow cavity retroreflector. A light intensity modulator is a device that can change its light transmission through applying electric signals on the device. A mere mechanical combination of a retroreflector and a light modulator can produce a retroreflecting modulator. However, for many important applications, such a simplistic combination can have only limited use because of a number of deficiencies. The most important are limited field of view and a poor performance in connection with the primitive structure.

U.S. Pat. No. 4,777,660, issued to Gould, discloses a retroreflective optical communication system. This system employs a mechanical combination of a cube-corner retroreflector and light modulator based on gas Stark effect cells. Such system is limited to work only with $CO_2$ lasers and gas cells.

SUMMARY OF THE INVENTION

An object of the present invention is to provide a etroreflecting modulator as an integrated device that can receive an incident light beam from a broad field of view and retransmit the light beam back to the light source site without the need for optical alignment.

A further object is to provide a retroreflecting modulator wherein the retroreflected light beam is light-intensity modulated by a local signal so that the light source site can remotely and wirelessly gain information from the retroreflecting modulator.

A still further object is to provide a retroreflecting modulator wherein the signal with which the retroreflected signal is modulated depends upon the direction of the incident light beam so that the light source site can determine the relative direction of the retroreflecting modulator.

The present invention provides an optical system that combines retroreflection and light modulation in an integrated device. Such a retroreflecting modulation device possesses the capability of retroreflection and light intensity (amplitude) modulation simultaneously.

The preferred retroreflecting modulator of the present invention comprises a light receiving and focusing device, preferably a specialty sphere lens, a light guide, preferably a fiber optic plate, a light modulator, preferably a liquid crystal modulator, and a mirror. In summary, the incident light beam falls on the front surface of the light receiving and focusing device, where it is focused as a spot on a focal surface. The light guide transmits the light to the light modulator in the forward direction. After passing through the light modulator, the mirror reflects the light back through the light modulator in the reverse direction at the essentially same location. The light guide transmits the modulated, reflected light back to the focal surface of the light receiving and focusing device, where it is emitted in the opposite direction as the incident light.

The preferred light-receiving and focusing device is a specialty sphere lens, defined as a lens with a hemispherical focal surface. The advantages of the specialty sphere lens include spherical symmetry and a wide angle field of view, which ideally can cover the entire half space of the view field. Ideally, each incident direction has its own unique focal point, where there is one-to-one correspondence between each incident direction and each focal point.

The focal surface is essentially coincident with the front surface of the light guide, preferably a fiber optic late. The fiber optic plate has a plurality of optical fibers extending from its front surface to a planar rear surface abutting the light modulator. Alternatively, the light guide is a sheet or slab of light opaque material with a plurality of through channels.

The preferred light modulator is a liquid crystal modulator, which comprises a thin film of liquid crystal material sandwiched between a pair of transparent electrodes. An electrical signal representing the information to be sent is applied to the electrodes to control the transmission characteristics of the liquid crystal film. The simplest liquid crystal modulator is position-unresolved, that is, there is a single liquid crystal film and a single pair electrodes for providing a single pixel. If the signal represents a fixed value the retroreflecting modulator may be called an optical transponder. When the fixed value is unique to a system, the optical transponder may be called an identification-coded (ID-coded) optical transponder.

Another liquid crystal modulator, the spatially-resolvable light modulator, is partitioned into a two-dimensional matrix of pixels, where each pixel is provided with a modulation signal. The result is that the modulation signal imposed on the light is dependent upon the direction from which the incident light originated. An orientation-coded optical transponder is a retroreflecting modulator that uses a spatially-resolvable light modulator where each pixel has a unique fixed code.

There are a number ways to implement the spatially-resolvable light modulator, including (1) using a currently available two-dimensional liquid crystal spatial modulator, where each pixel is energized with a unique code, (2) using two stacked liquid crystal modulators, where each modulator has a set of parallel lines and the lines of one modulator is perpendicular to the lines of the other modulator, and each crossing point between the perpendicular lines represents a pixel, (3) using a single liquid crystal film with the front electrodes as a set of independent parallel lines and the rear electrodes as a set of independent parallel lines perpendicular to the front set, and each crossing point between the perpendicular lines represents a pixel, and (4) using a currently available two-dimensional liquid crystal modulator with drive electronics modified to change the pixel-based coding scheme to a line-based coding scheme.

Alternatives to the liquid crystal modulator include the recently developed micro-electro-mechanical (MEM) devices such as the grating light valve (GLV). Each pixel of a GLV is comprised of a number of parallel thin, reflective ribbons suspended in the air over a substrate. By applying voltages across the air gap, ribbons are pulled toward the substrate, creating diffraction effects in incident light.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION

Figure 1:
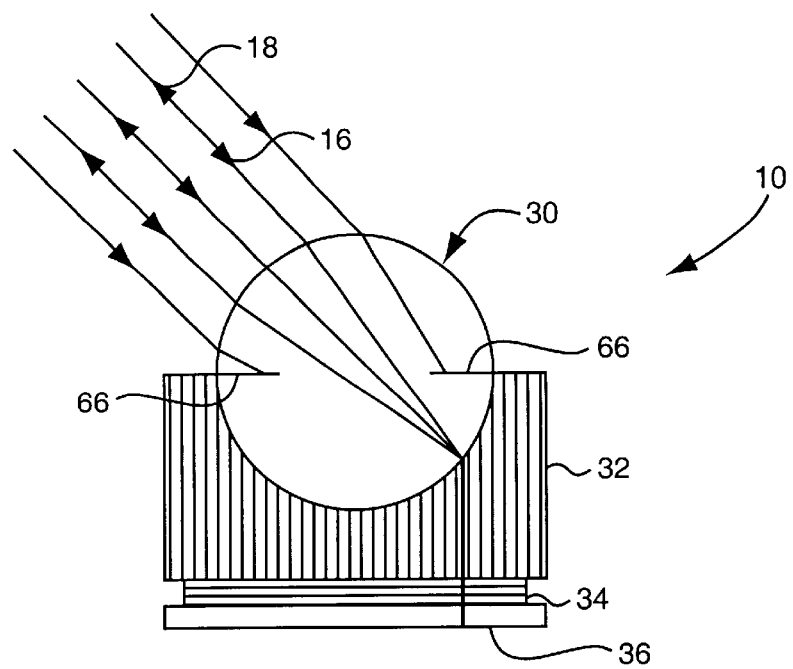
FIG. 1 is a cross-sectional side view of a preferred embodiment of the retroreflecting modulator of the present invention.
Figure 2:
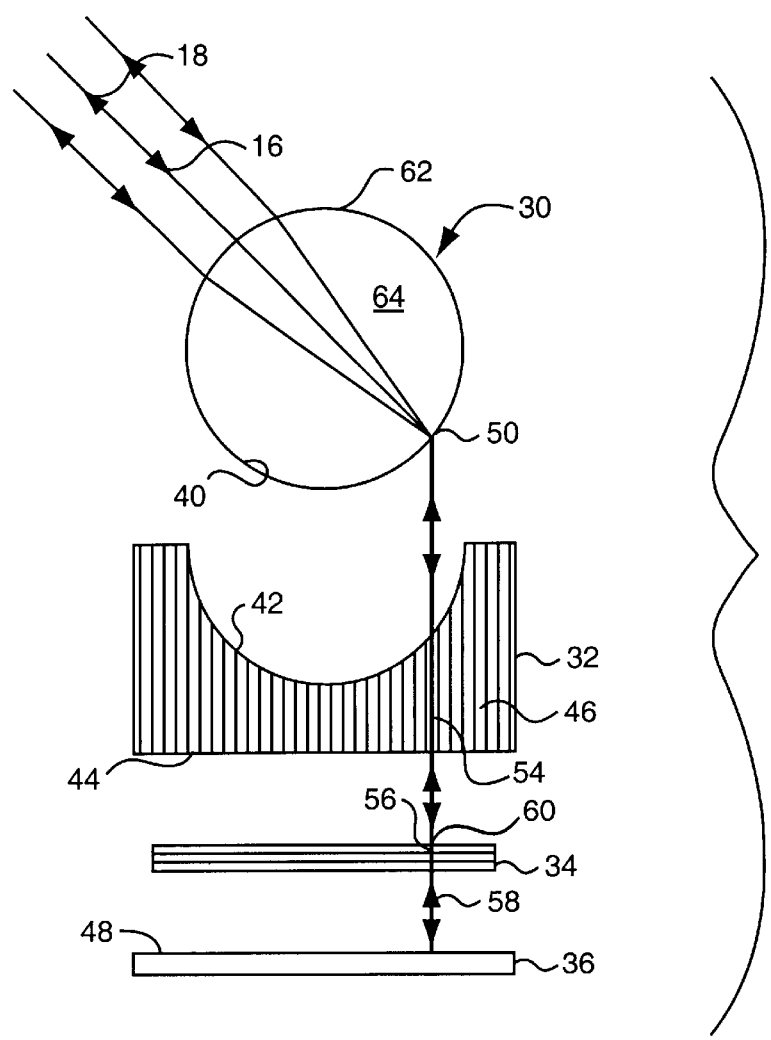
FIG. 2 is an exploded cross-sectional side view of the retroreflecting modulator of FIG. 1.

A preferred embodiment of the retroreflecting modulator 10 of the present invention is shown in FIGS. 1 and 2, and comprises (1) a light receiving and focusing device 30, (2) a light guide 32, (3) a light modulator 34, and (4) a reflecting mirror 36. The preferred light receiving and focusing device 30 is a specialty sphere lens 30, which has a three dimensional, hemispherical focal surface 40. The focal surface 40 is essentially coincident with the front surface 42 of the light guide 32. The preferred light guide 32 is a specialty fiber optic plate that has a plurality of optical fibers 46 extending from its hemispherical concave front surface 42 to a planar rear surface 44. The light modulator 34 is sandwiched between the light guide rear surface 44 and the reflecting surface 48 of the mirror 36.

The incident light beam 16 falls on the front surface 62 of the sphere lens 30. There is no restriction on the type of light that may be used in a system employing the present invention. In some systems, particularly where the light source is a significant distance from the retroreflecting modulator 10, the light source is a laser. In more compact systems, a light-emitting diode (LED), incandescent bulb, or other non-coherent light source may be used.

The incident beam 16 is focused by the specialty sphere lens 30 as a spot on its focal surface 40 at a point 50 (the direction of the beam 16 and the location of the focal point 50 are chosen for illustration only). The light guide 32 receives the focused light energy at its front surface 42 and transmits it via the light guiding channels 54 to a spot 60 on the light modulator 34 in the forward direction. After passing through the light modulator 34, as at 56, the light energy is reflected, as at 58, by the reflecting surface 36, and passes through the light modulator 34 in the reverse direction at the essentially same location 60. Because the light speed is extremely fast, when the light energy passes through the modulator in the forward and reverse directions, the light energy undergoes essentially the same modulation even under the fastest changing modulation signal conditions. The light energy undergoes modulation according to the electric signals applied on the modulator 34 as a function of time. The light guide 32 receives the reflected light energy and guides it back to the focal surface of the lens 40 to the focal point 50. The modulated, reflected light energy at the focal point 50 behaves like a new light source, emitting light in a broad range of directions. However, because of the operation of the lens 30, the light 18 exiting from the front surface 62 of the lens 30 will follow essentially the same path as the incident light 16, but in the opposite direction. According to the well-known conjugation principle in geometry optics, when the light is emitted from the focal point, the light will take the same path in the reverse direction, back toward the original light source.

The components of the retroreflecting modulator 10 are described in greater detail.

1. The Light Receiving and Focusing Device 30

Preferably, a specialty sphere lens is used as a light-receiving and focusing device 30. The present invention defines a specialty sphere lens as a lens that has a hemispherical focal surface. This definition may be different from many commercial sphere lenses, in which the focal surface is designed to be planar. Consequently, the present invention denotes the lens with a hemispherical Focal surface a specialty sphere lens. For clarity, the term "focal surface" and "focal plane" must be differentiated. A focal surface is defined as a three-dimensional surface that may be, for example, a hemispherical surface. A focal plane is strictly limited to be a two-dimensional plane. A focal plane is the same as a focal planar surface.

The most important advantage of the specialty sphere lens is its wide angle field of view. Because the specialty sphere lens has a hemispherical focal surface, it has a spherical symmetry in focusing the light beam. As long as the light beam from one incident direction focuses well, the light beams from all other frontal incident directions will focus equally well. As a result, the ideal specialty sphere lens has a view field essentially equal to $2\pi$ steradians of solid angle, which covers $-90°$ to $+90°$ pitch and yaw, or equivalently, covers the entire half space of the view field.

There are a number of ways for making a specialty sphere lens. The simplest specialty sphere lens is a glass sphere with the index of refraction of the material approximately equal to 2.0. According to geometry optics, the back hemispherical surface of such a sphere is the focal surface of the lens. A specialty sphere lens may also be made by using a combination of a sphere core together with a number of spherical or hemispherical shells. The dimension and indices of the materials of the sphere core and the shells can be accurately determined by using standard ray-tracing software.

The specialty sphere lens may be small, i.e. 2 mm, or large, i.e. 1 m. When the diameter of the sphere is very small, generally the light source can be approximately located at an infinitely long distance, and the incident light beam can be assumed to be collimated. For some rare cases, when the light source is very close to the sphere lens, the sphere lens needs a special design to ensure a sharply focused image on its back hemispherical surface.

As seen in FIGS. 1 and 2, the specialty sphere lens 30 has a front hemispherical surface 62 facing the incident light beam 16, and a lens body 64 with an appropriate index of refraction for changing the direction of the light beam 16. Ideally, all of the light beams 16 from the same direction are focused to the same focal point 50. Conversely, light beams from different directions are focused at different focal points. There is one-to-one correspondence between each incident direction and each focal point. The sum of all focal points constitutes the focal surface 40.

When necessary, a diaphragm 66 can be used to limit the light beam size in the specialty sphere lens 30. When a diaphragm 66 is used, the focus can be sharper. Under some circumstance, the diaphragm 66 may not be required.

The light receiving and focusing device is not limited to a specialty sphere lens. Any lens or lens system can be used, as long as the focal surface of the lens and the front surface of the light guide, as described below, are substantially identical.

2. The Light Guide 32

In the present invention, the light guide 32 is a light energy guiding and transmission device. The preferred light guide 32 is a fiber optic plate that is fabricated from a large number of substantially parallel optical fibers 46 running between two opposing surfaces, the front surface 42 and the rear surface 44. Light energy in the fiberoptic plate 32 propagates along these optical fibers 46. During propagation, the light energy undergoes multiple small angle reflections from the cladding material of the optical fiber 46. Consequently, the entire light energy is transmitted from the front surface 42 to the rear surface 44 with minimal spread. In the preferred embodiment, the diameter of the optical fiber 46 in the range of approximately 2.5 $\mu$m to 200 $\mu$m.

In the preferred embodiment, one that uses a specialty sphere lens, the front surface 42 is a concave hemispherical surface that is essentially coincident with the focal surface 40 of the specialty sphere lens 30. When the light-receiving and focusing device has a focal plane, the front surface 42 is also planar. The rear surface 44 is planar in order to abut the light modulator 34. Thus, the dimensions of the fiberoptic plate 32 are much dependent on the dimensions of specialty sphere lens 30. The body of the fiberoptic plate 32 can have any shape, but for convenience in fabrication, it is round or square.

The length of the fiberoptic plate 32, that is, the distance between the front surface 42 and rear surface 44, may vary depending on the particular application. When the light modulator 34 must be very close to the specialty sphere lens 30, a fiberoptic plate 32 with a length slightly larger than the radius of the hemispherical focal surface 40 can be used.

In operation, the focused light energy at the focal point 50 falls on one or several fibers 46 according to how sharp the focus is. The light energy propagates along the fibers 46, as at 54, until it reaches the rear surface 44. On its return trip from the mirror 36, the light traverses the same fibers 46, but in the opposite direction.

There are a number of alternatives to the fiberoptic plate 32 contemplated by the present invention. These alternatives include fiberoptic tapers, fiberoptic light guides, fiberoptic bundles, and fiberoptic multifiber conduits.

Another type of alternative is not based on optical fibers. The device is a sheet or slab of light opaque material with a plurality of through channels. The channels may be empty or may be filled with light transmitting materials. Such channeled components can be made by mechanical or chemical fabrication methods, such as molding, mechanical drilling, laser drilling, or chemical deposition, chemical etching methods. The channel diameter size is preferably in the range of approximately 200 $\mu$m to 2 mm.

3. The Light Modulator 34

Figure 3:
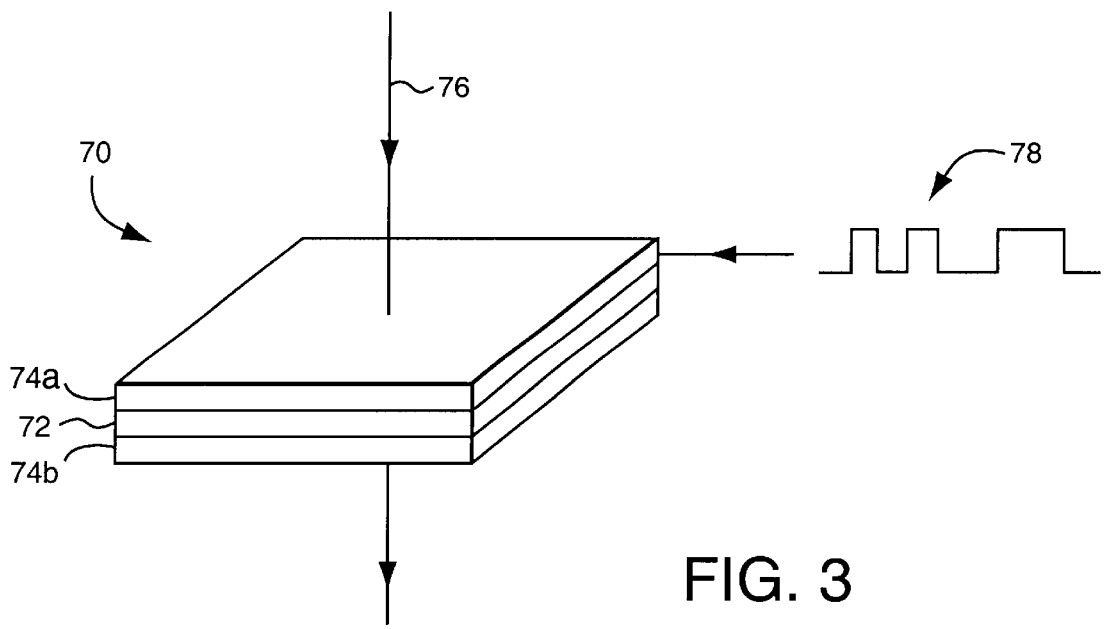
FIG. 3 is a perspective view of a conventional single pixel liquid crystal device.

A preferred embodiment of the present invention uses standard liquid crystal modulator techniques for the light modulator 34. As shown in FIG. 3, a typical transmissive liquid crystal light modulator 70 comprises a thin film of liquid crystal material 72 sandwiched between a pair of transparent electrodes 74 (individually, 74a and 74b). An electrical signal is applied to the electrodes 74 to control the transmission characteristics of the liquid crystal film 72. The liquid crystal material can be nematic type or ferroelectric type, polymer-dispersed liquid crystal film, or other materials. The thickness of the liquid crystal film 72 is usually between 1 $\mu$m and 10 $\mu$m. A typical thickness of each electrode 74 is typically about 50 nm. Typical voltage of the electrical signal is between 0 V to 10 V. Because a liquid crystal modulator 70 can be made very thin, the spreading of the light energy passing through the modulator 70 can be negligible. In the small number of situations when the light spread is not negligible, there are techniques known in the art for compensation and correction. Appropriate polarizers may be added in the light path according to standard practice and the specific requirements of the specific liquid crystal films. For example, polymer dispersed liquid crystal film does not require a polarizer. For other liquid crystal materials, the polarizer is generally an internal component of the liquid crystal light modulator.

The simplest liquid crystal modulator 70, shown in FIG. 3, is position-unresolved, that is, there is a single liquid crystal film 72 and a single pair electrodes 74 for providing a single pixel. An electrical signal 78 implementing a series of binary digits (on or off) representing the signal to be imposed on the light beam is applied to the electrodes 74 to time-modulate the light 76 traversing the modulator 70. The signal can come from any source. If the signal is a fixed value the retroreflecting modulator may be called an optical transponder. When the fixed value contains only unique information for identifying the device in order to distinguish it from others of the same type in a system, the optical transponder may be called an identification-coded (ID-coded) optical transponder.

Figure 4:
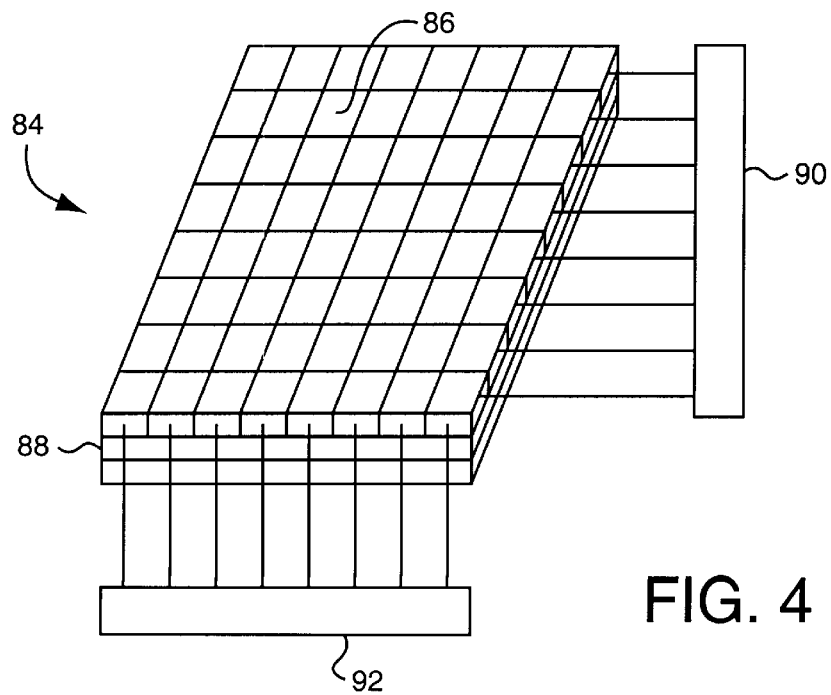
FIG. 4 is a perspective view of a conventional two-dimensional liquid crystal device.

In another liquid crystal modulator 84, shown in FIG. 4, the light modulator is partitioned into a two-dimensional matrix of pixels 86, where each pixel 86 is provided with a unique modulation signal. Consequently, the modulation signal imposed on the light energy is dependent upon the location of the focal point 50 on the focal surface 40 which, in turn, is dependent upon the direction from which the incident light beam 16 originated. This type of light modulator is called a spatially-resolvable light modulator.

In one application, when a fixed unique code is imparted by a pixel on the retroreflected light beam 18, the orientation of the retroreflecting modulator 10 relative to an external reference point, such as the light source site, may be determined. A retroreflecting modulator incorporating this type of liquid crystal modulator is called an orientation-coded optical transponder.

There is a one-to-one correspondence between each incident light beam direction 16, each focus point 50 on the focal surface 40, and each location 60 on the light modulator 34. As the number of pixels increase, the spatial resolution of the spatially-resolvable modulator increases, and correspondingly, the angular resolution of the orientation-coded optical transponder increases.

There are a number ways to implement the spatially-resolvable light modulator, as described below.

1. The first embodiment employs a currently available two-dimensional liquid crystal spatial modulator. As shown in FIG. 4, a typical currently available two-dimensional liquid crystal spatial modulator is composed of an N×N matrix of pixels 86. An electrical modulation signal is applied to each pixel 86 sequentially. The electrical modulation signal controls the transmission characteristics of the liquid crystal film 88. The electrical signals are sequentially sent to each pixel 86 through a row shift register 90 and a column shift register 92, pixel by pixel and line by line. In the present invention, the electrical signal is preferably in simple binary form, that is 0 or 1. For example, when a "1" signal is applied, the liquid crystal film 92 at the pixel 86 becomes opaque; when a "0" signal is applied, the pixel 86 becomes transparent. One whole frame of N×N binary data provides one-bit modulation code for each pixel 86. A total of M frames of binary data applied sequentially in time provides an M-bit modulation code for each pixel 86.

Figure 5:
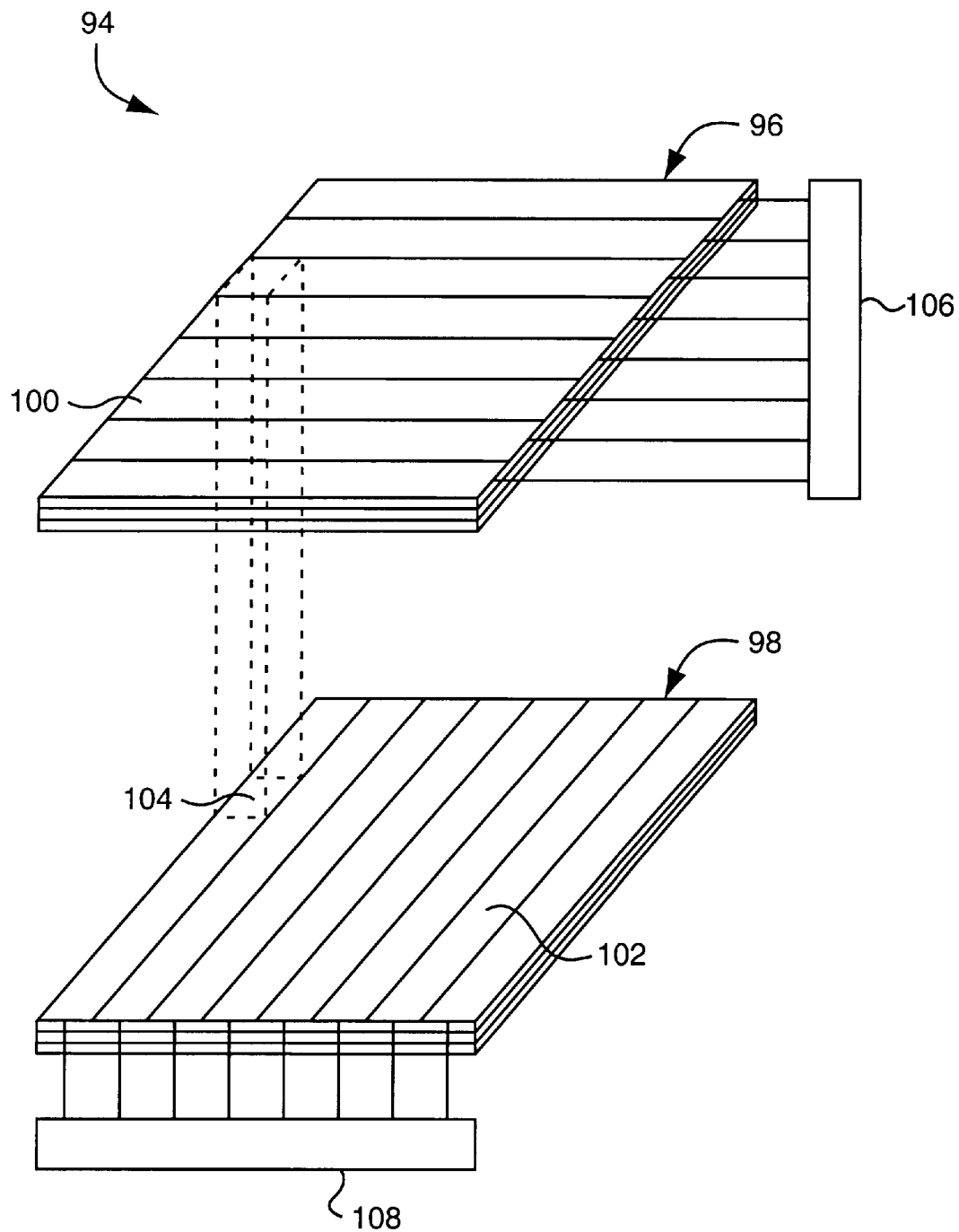
FIG. 5 is an exploded perspective view of a multiple pixel, two dimensional light modulator implemented with two linear liquid crystal devices.

2. In the second embodiment 94, shown in FIG. 5, the light modulator uses two mutually perpendicular linear liquid crystal modulators 96, 98. Each linear liquid crystal modulator 96, 98 has a number of thin parallel lines 100, 102. Each crossing point between the perpendicular lines 100, 102 represents a pixel 104. All the lines 100 of one modulator 96 are connected in parallel to an electronic driving circuit 106 and all the lines 102 of the other modulator 98 are connected in parallel to another electronic driving circuit 108. The driving circuits 106 provide a fixed set of modulation codes to the linear modulator 96 with each line 100 having a unique fixed code. The driving circuits 108 provide a fixed set of modulation codes to the linear modulator 98 with each line 102 having a unique fixed code. For example, the first liquid crystal modulator 96 can impress a modulation code representing the x-coordinate of the row, and the second modulator 98 can impress a modulation code representing the y-coordinate of the column. Note that in the time sequence, there are two time periods $T_1$ and $T_2$. During $T_1$, the light beam undergoes a x-coordinate modulation through the first modulator 96, while the second modulator 98 remains transparent. $T_2$ follows $T_1$, during which the modulation code of the y-coordinate is applied by the second modulator 98, while the first modulator 96 remains transparent. During the total modulation time $T_1+T_2$, a complete set of modulation data, the x-coordinate and the y-coordinate, is impressed on the light beam.

Figure 6:
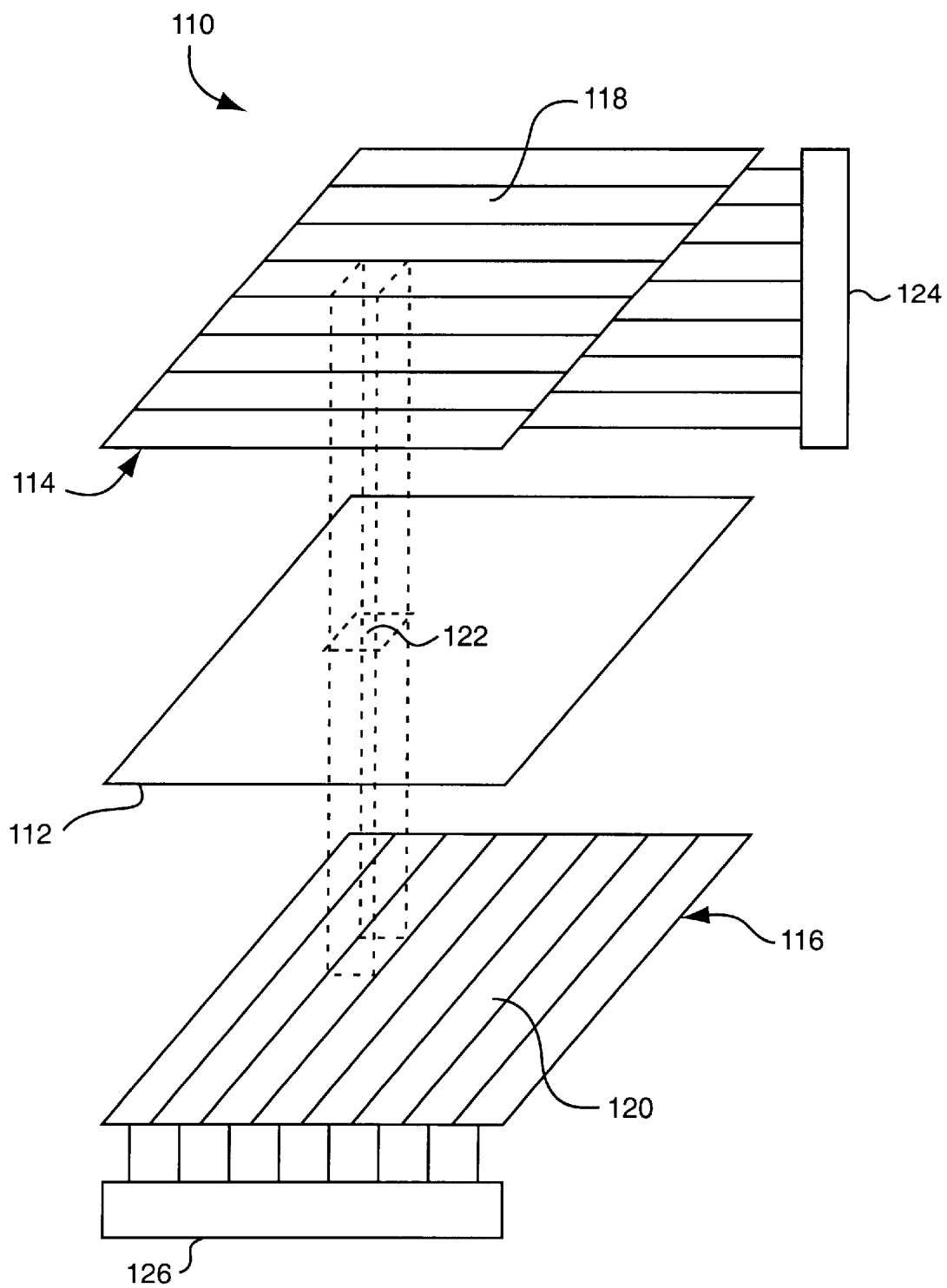
FIG. 6 is an exploded perspective view of a multiple pixel, two dimensional light modulator implemented with perpendicular sets of electrodes.

3. The third embodiment 110 employs a single liquid crystal film 112 with perpendicular electrode pairs 114, 116, as shown in FIG. 6. All the electrodes are fabricated as independent parallel lines 118, 120, and the electrode lines 118 on one electrode 114 are perpendicular to the electrode lines 120 on the other electrode 116. Each crossing point between the perpendicular lines represents a pixel 122. All the lines 118 of one electrode 114 are connected in parallel to an electronic driving circuit 124 and all the lines 120 of the other electrode 116 are connected in parallel to another electronic driving circuit 126. The driving circuits 124, 126 provide unique modulation codes to the electrode lines 100, 102, respectively. The code timing may be similar to the second embodiment immediately above. During $T_1$, the light beam undergoes a x-coordinate modulation through the row electrodes 114, while all of the column electrodes 116 are maintained at a constant voltage. $T_2$ follows $T_1$, during which the modulation code of the y-coordinate is applied through the column electrodes 116, while the row electrodes 114 are maintained at a constant voltage. As compared to the second embodiment described immediately above, this embodiment has the advantage of being generally easier to fabricate.

4. In the fourth embodiment, a currently available two-dimensional liquid crystal modulator is modified. Currently available two-dimensional liquid crystal modulators are not designed specifically for the present invention; they are general-purpose designs. There are a number of ways to improve the currently available liquid crystal modulator to better serve as a modulation device in an orientation-coded optical transponder, and all are contemplated for use by the present invention. One such improvement is to change the pixel-based coding scheme to a line-based coding scheme. The modulation signal is first applied to all pixels of the same column simultaneously, one column at a time. Then the modulation signal is applied to all pixels of the same row simultaneously, one row at a time. The advantage is that the currently available fabrication process of the integrated circuit chips is maintained; the only change being to the external driving electronics.

Alternatively to the liquid-crystal-based devices, the light modulator 34/mirror 36 combination as seen in FIGS. 1 and 2 may be replaced by any device capable of modulating a light beam and reflecting light. For example, recently developed micro-electro-mechanical (MEM) devices such as the grating light valve (GLV) may be used. The GLV uses reflection and diffraction to create dark and bright signals. Each pixel of a GLV is comprised of a number of parallel thin, reflective ribbons suspended in the air over a substrate. When all the reflecting ribbons are planar, incident light is reflected. By applying voltages across the air gap, every other ribbon can be pulled toward the substrate, creating diffraction effects in incident light. As a result, the intensity of the reflected light can be controlled. The GLV can be fabricated as linear, having a number of pixels along a line, or as two-dimensional, having n×m number of pixels on a small area. The major advantage of the GLV is in its very high speed, suitable for high speed data transmission.

The GLV does not have a thin film structure as does the liquid crystal modulator, so an additional lens system for optimal coupling is needed. Incorporating such a standard lens system is within the average skill of standard optical design. A typical example of incorporating a lens system is described below with respect to alternate system configurations.

Figure 7:
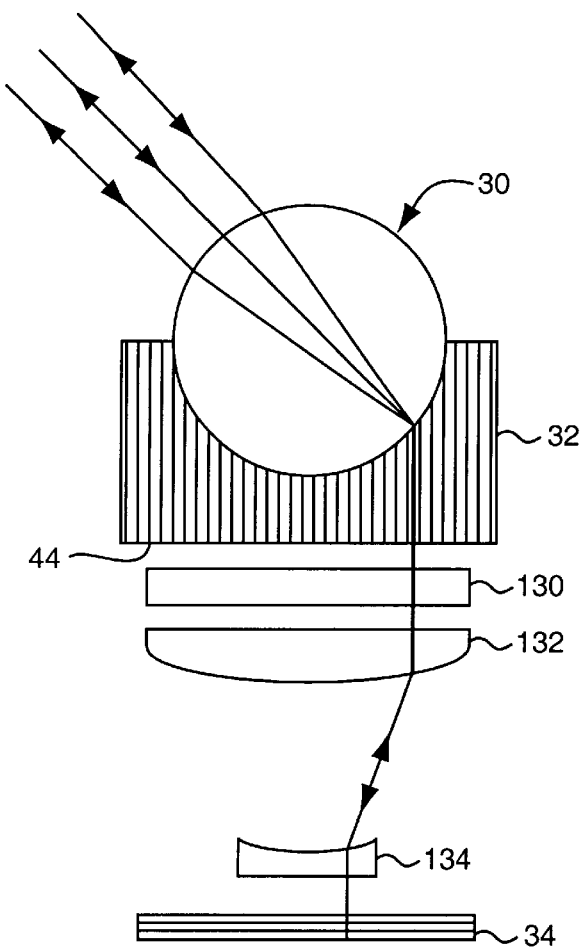
FIG. 7 illustrates an example of a retroreflecting modulator with additional optical components between the light guide and the light modulator.

FIGS. 1 and 2 show the light modulator 34 abutting the rear surface of the light guide 32. In some cases, this close contact is not necessary. In such cases, additional standard optical components can be interposed between the light guide and the light modulator for coupling. For example, an optical assembly, as seen in FIG. 7, comprising a microlens array 130, a concave lens 132, and a convex lens 134 may be used to couple the light guide 32 and the light modulator 34. The microlens array 130 changes the light spot on the rear surface 44 of the light guide 32 to a narrow collimated light beam. A microlens array 130 is composed of a large number of lenses each with a small diameter. The light emitted from a light energy spot on the rear surface 44 of the light guide 32 is collimated and limited to a small region corresponding to the single microlens. The concave lens 132 and the convex lens 134 reduce the size of the collimated light beams to be compatible with that of a smaller device, such as a GLV modulator 34. After reflection, the collimated narrow light beam returns to the same spot and enters the light guide 32 at the same place. The microlens array 130, concave lens 132, and convex lens 134 system are conventional lens system. Using any other conventional lens system to achieve the same objective is contemplated by the present invention.

Figure 8:
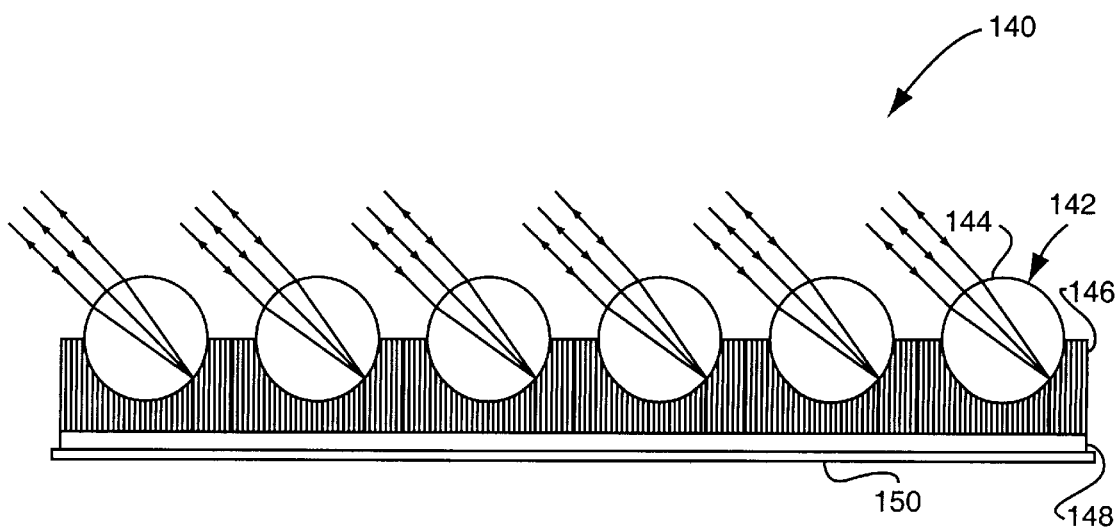
FIG. 8 is an end view of an alternate retroreflecting modulator.

Alternatively, as in FIG. 8, a number of the lens 144/light energy guide 146 assemblies 142 can be combined with a single light modulator 148/reflector 150 to form a retroreflecting modulator assembly 140 with an extended area. Such an assembly 140 can be designed with a thin sheet having a thickness as small as 2 mm, with a reflective area as large as between 1 cm² to 1,000 cm².

Thus it has been shown and described a retroreflecting modulator which satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

What is claimed is:

1. A retroreflecting modulator comprising from front to back:
   a. a lens having wide field of view, a front light-receiving surface, and a rear three-dimensional focal surface composed of focal points, each of said focal points corresponding to a unique direction of a light beam incident on said light-receiving surface within said field of view;
   b. a fiber optic light guide including a plurality of light channels having barriers for preventing leakage between said channels, and having a receiving surface substantially coincident with said lens focal surface;
   c. a light modulator having a reflective rear surface; and
   d. said lens front light-receiving surface receiving said incident light beam and focusing said incident light beam as focused light at said corresponding focal point on said focal surface, said fiber optic light guide transmitting said focused light to said light modulator, said light modulator modulating said focused light as modulated light and reflecting said modulated light back to said fiber optic light guide, said fiber optic light guide transmitting said modulated light to said corresponding focal point, said lens transmitting said modulated light to said lens front light-receiving surface, and said lens front light-receiving surface emitting said modulated light in a direction opposite said direction of said incident light beam.

2. The retroreflecting modulator of claim 1 wherein said lens abuts said fiber optic light guide and said fiber optic light guide abuts said light modulator.

3. The retroreflecting modulator of claim 1 wherein said lens is a specialty sphere lens.

4. The retroreflecting modulator of claim 1 wherein said fiber optic light guide is a fiber optic plate.

5. The retroreflecting modulator of claim 1 wherein said retroreflecting modulator includes an optical assembly to couple said fiber optic light guide to said light modulator.

6. The retroreflecting modulator of claim 1 wherein said light modulator is a liquid crystal device.

7. The retroreflecting modulator of claim 1 wherein said light modulator provides the same modulation for said incident light of all of said unique directions.

8. The retroreflecting modulator of claim 7 wherein said light modulator modulates said focused light with a fixed predetermined code.

9. The retroreflecting modulator of claim 1 wherein said light modulator is spatially resolvable.

10. The retroreflecting modulator of claim 9 wherein said light modulator includes a two-dimensional matrix of pixels.

11. The retroreflecting modulator of claim 10 wherein each of said pixels modulates said focused light with a unique fixed predetermined code.

12. A retroreflecting modulator comprising from front to back:
    a. a specialty sphere lens having wide field of view, a front light-receiving surface, and a rear three-dimensional focal surface composed of focal points, each of said focal points corresponding to a unique direction of a light beam incident on said light-receiving surface within said field of view;
    b. a fiber optic plate having a receiving surface substantially coincident with said lens focal surface;
    c. a liquid crystal light modulator having a reflective rear surface; and
    d. said lens front light-receiving surface receiving said incident light beam and focusing said incident light beam as focused light at said corresponding focal point on said focal surface, said fiber optic plate transmitting said focused light to said light modulator, said light modulator modulating said focused light as modulated light and reflecting said modulated light back to said fiber optic plate, said fiber optic plate transmitting said modulated light to said corresponding focal point, said lens transmitting said modulated light to said lens front light-receiving surface, and said lens front light-receiving surface emitting said modulated light in a direction opposite said direction of said incident light beam.

13. The retroreflecting modulator of claim 12 wherein said lens abuts said fiber optic plate and said fiber optic plate abuts said light modulator.

14. The retroreflecting modulator of claim 12 wherein said light modulator provides the same modulation for incident light of all directions.

15. The retroreflecting modulator of claim 14 wherein said light modulator modulates said focused light with a fixed predetermined code.

16. The retroreflecting modulator of claim 12 wherein said light modulator includes a two-dimensional matrix of pixels.

17. The retroreflecting modulator of claim 16 wherein each of said pixels modulates said focused light with a unique fixed predetermined code.

\* \* \* \* \*